United States Patent [19]

Oster

[11] Patent Number: 4,526,063
[45] Date of Patent: Jul. 2, 1985

[54] THREE MODE DIFFERENTIAL

[75] Inventor: Terry L. Oster, Waterloo, Ind.

[73] Assignee: Dana Corporation, Toledo, Ohio

[21] Appl. No.: 350,541

[22] Filed: Feb. 19, 1982

[51] Int. Cl.³ .................... F16H 1/44; F16D 47/00
[52] U.S. Cl. .................... 74/710.5; 74/711;
192/48.3; 192/56 R
[58] Field of Search .......... 74/710, 710.5, 713,
74/711; 192/56 R, 67 R, 48.3

[56] References Cited

U.S. PATENT DOCUMENTS

| | | | |
|---|---|---|---|
| 964,387 | 7/1910 | Burnam | 74/710.5 |
| 1,243,720 | 10/1917 | Eidson et al. | 74/710.5 |
| 2,443,590 | 6/1948 | Alden | 74/781 R X |
| 2,947,200 | 8/1960 | Stump | 74/695 |
| 3,195,371 | 7/1965 | Christie | 74/695 |
| 3,265,173 | 8/1966 | Russell | 192/67 R |
| 3,448,635 | 6/1969 | Nelson | 74/710.5 |
| 3,762,503 | 10/1973 | Wilder et al. | 74/711 X |
| 3,815,442 | 6/1974 | McAninch et al. | 74/710.5 X |
| 3,929,036 | 12/1975 | Shealy | 74/710.5 X |
| 4,207,780 | 6/1980 | Saxton | 74/710.5 |
| 4,227,427 | 10/1980 | Dick | 74/710 X |
| 4,263,824 | 4/1981 | Mueller | 74/711 |
| 4,271,722 | 6/1981 | Campbell | 74/713 X |

Primary Examiner—Allan D. Herrmann
Assistant Examiner—Joseph M. Rolnicki
Attorney, Agent, or Firm—F. B. McDonald

[57] ABSTRACT

A limited slip axle differential mechanism for a vehicle provides for three distinct modes of axle operation, each selectable by a single operator control function. The mechanism provides for conventional axle differentiation, biased differentiation, or operation as a solid axle system. In a preferred embodiment, two separate clutching systems are employed jointly or singularly in providing respective modes of operation, wherein the choices of mode, and, to a lesser extent, resultant driving conditions, determine resultant relative rotations of the vehicle wheels and associated axle shafts.

8 Claims, 3 Drawing Figures

THREE MODE DIFFERENTIAL

BACKGROUND OF THE INVENTION

This invention relates to axle differential mechanisms employed in vehicular interaxle or final drives, for achieving desired distributions of driving torque to the axles and associated wheels of a vehicle. More particularly, the invention relates to selectively actuated modes of axle differentiation within a single axle system.

The need for differentiation or variable distribution of driving torque to the driving axles of a vehicle has, of course, long ago been recognized and achieved. Thus, the conventional or unbiased differential allows for differences in angular velocities between opposed driving wheels upon the turning of corners. However, limiting differential action has also been achieved more lately for the purpose of avoiding the wheel spins whenever one of the driving wheels associated with an otherwise conventional differential encounters poor traction.

The usual devices for limiting differential action have generally utilized friction discs for the elimination of differential action until some predetermined safe amount of friction torque is exceeded, at which time the device permits differentiation.

The advantages and functions of a differential employing the combination of conventional or unbiased differentiation and biased differentiation are also well known and understood. For example, U.S. Pat. No. 3,448,635, issued to Nelson, discloses a dual mode differential mechanism containing both unbiased and biased differentiation modes, each selectively actuated by operator. By avoiding an otherwise continuously biased operation, a dual mode differential and mechanism provides for improved life of the friction disc devices employed within the differential. As biasing is not required during the majority of driving time, an overall improved clutch is achieved in that the clutch is rendered more effective and suitable over a wider range of design parameters.

It is further recognized, however, that although selection between unbiased and biased differential modes is beneficial, there are instances when a non-differentied or "solid axle" operation is both more safe and more desirable. Thus, for example, there are conditions when, in the limited slip mode, the differential input torque will cycle between values above and below the predetermined safe torque value of the limiting device. This action results in erratic "on and off" differential behavior, during which time the applied torque is shifted from one opposed driving wheel to the other, and can occasionally result in premature failure of the differential limiting device or devices.

Under such circumstances, it would be desirable to, at least momentarily, effectively avoid differential action entirely, preferably via the same control employed to select between conventional and biased differential action.

SUMMARY OF THE INVENTION

The present invention provides a means by which an operator may, through a single differential mechanism, select between conventional, biased, and non-differentiated axle modes. The non-differentiated axle mode provides for avoidance of all differential action at operator option under driving or road conditions in which such avoidance is desirable.

In a preferred embodiment, two separate clutching systems are employed to provide for the three respective modes of operation, each selectable by an operator. Thus, one clutch system is a friction disc mechanism operably connectable between a differential power input member and at least one differential output member. The second clutch system is a sliding clutch collar mechanism positioned over one differential output shaft, and selectively engageable with either the output member or the differential case and the output member in combination. Additionally, the mechanism is disengageable entirely from either member.

DETAILED DESCRIPTION OF PREFERRED EMBODIMENTS

Figure 1:
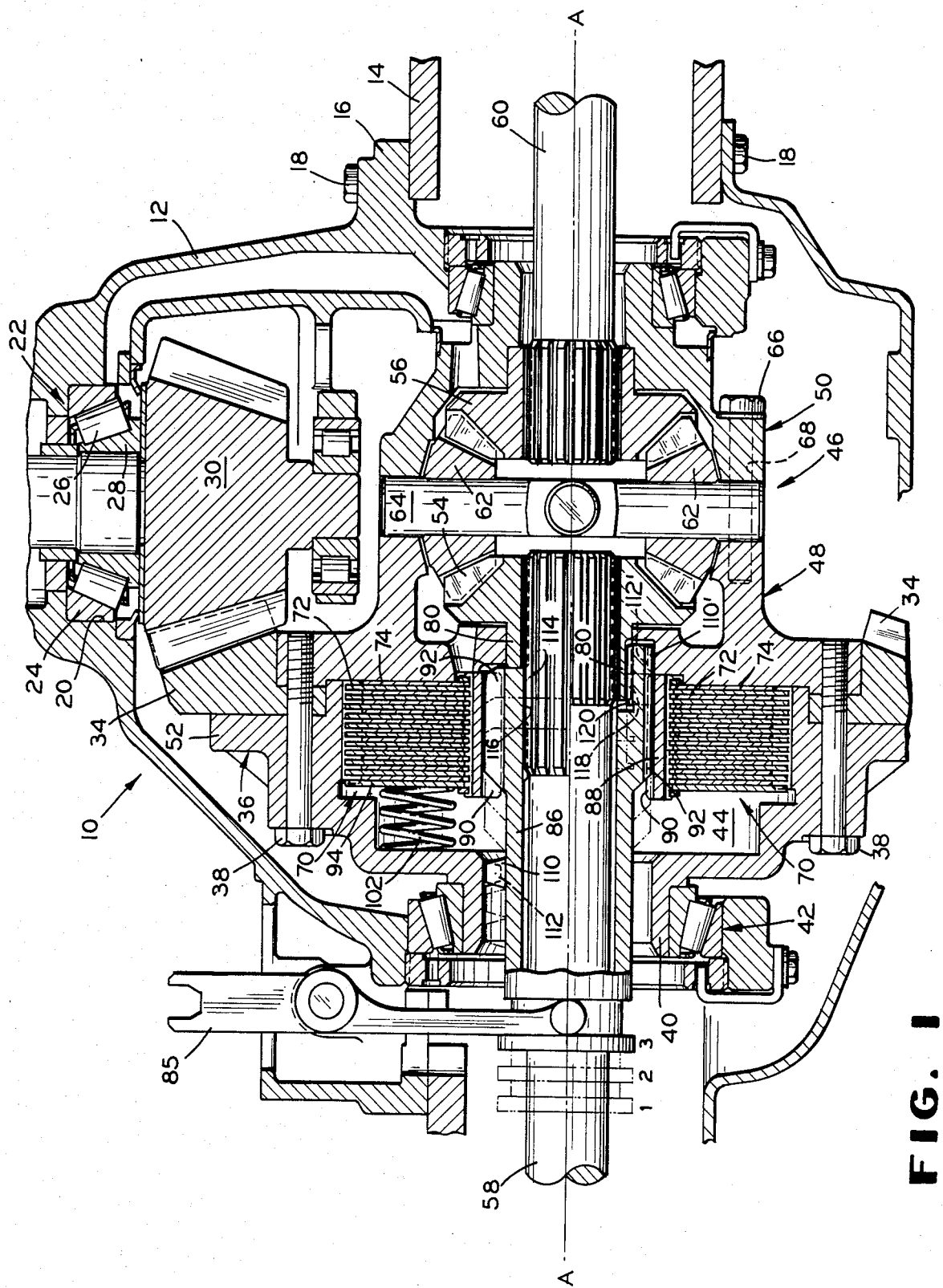
FIG. 1 is a sectional view of a differential mechanism which depicts two separate embodiments of the present invention; a first is shown above centerline A—A, while a second is shown below same centerline.
Figure 2:
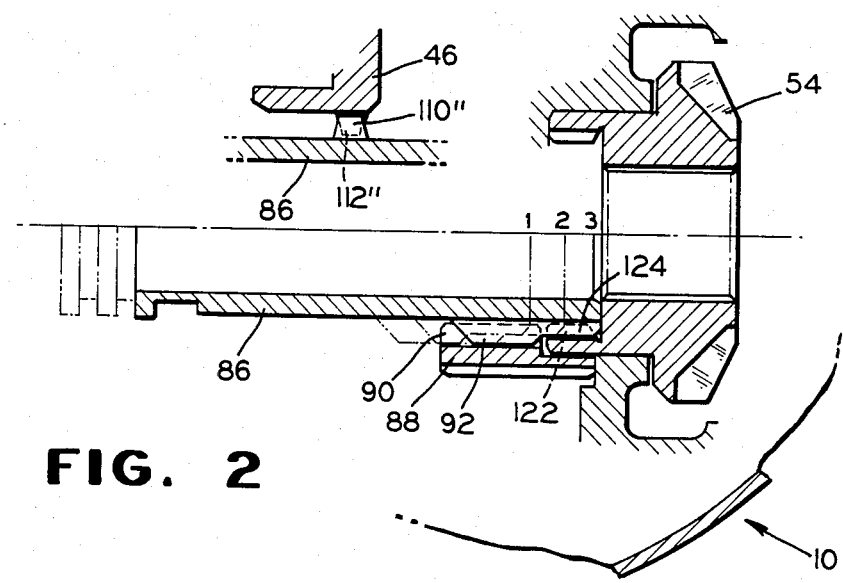
FIG. 2 is a sectional fragmentary view of a third embodiment of the present invention.
Figure 3:
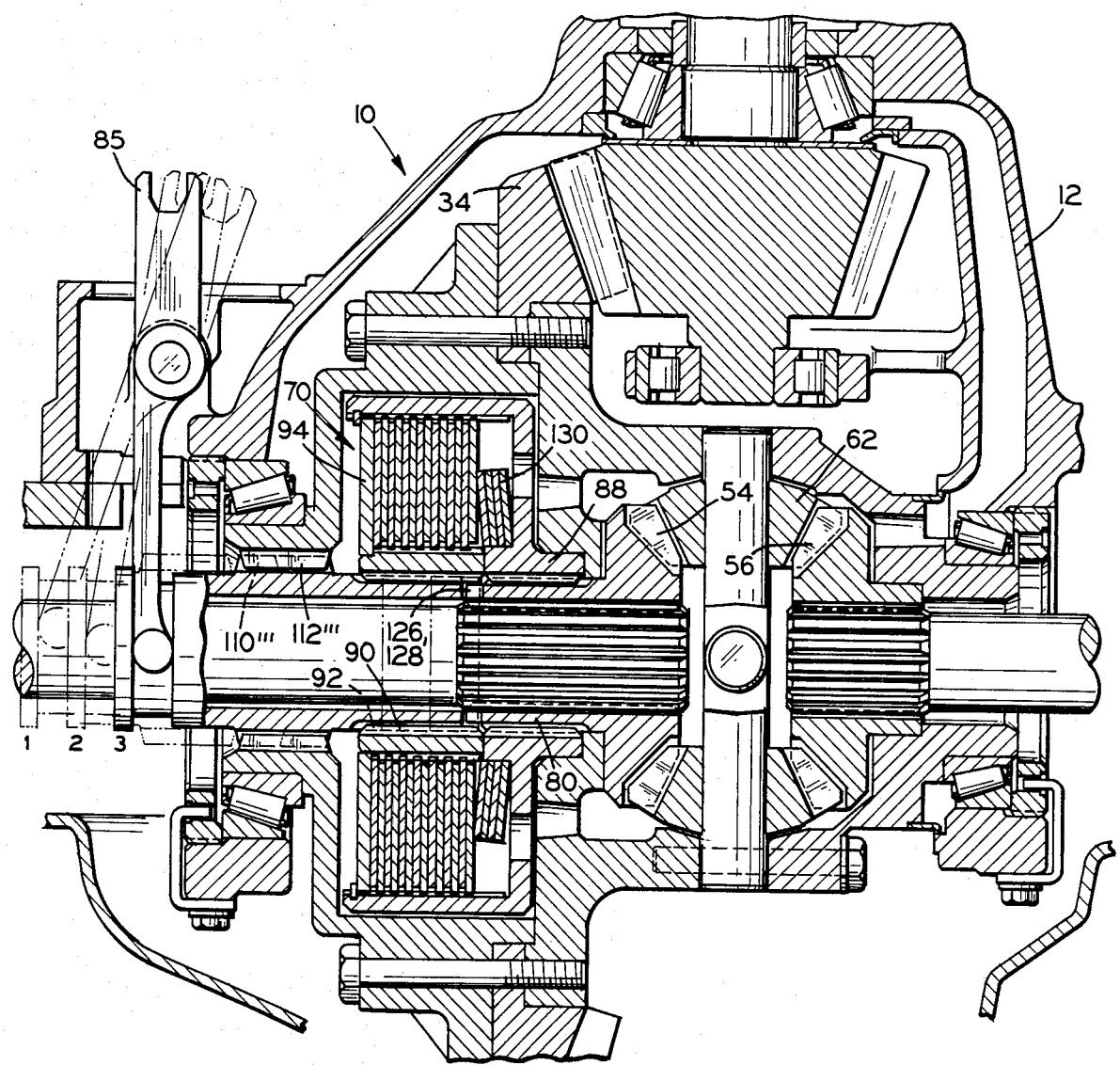
FIG. 3 is a sectional view of a fourth embodiment of the present invention.

FIGS. 1-3 depict four distinct preferred embodiments of the axle differential mechanism 10 of this invention. Referring initially to FIG. 1, however, the following general comments will apply to each of the herein described embodiments. Specific distinctions as to each embodiment will be detailed thereafter. A differential carrier 12 is fastened to an axle housing 14 by a peripheral flange portion 16. Conventional means such as bolts 18 secure the peripheral flange portion 16 to the carrier. An opening 20 provides a means through which an input pinion 30 extends into the differential carrier 12. A bearing assembly is disposed within the opening 20, the assembly comprising an outer race 24, bearings 26, and an inner race 28, which rotatably supports the input pinion 30. The pinion 30 is connected to a drive shaft (not shown) extending from a conventional prime mover, which includes a conventional clutch and change speed transmission.

The ring gear 34 is in gear meshing relationship with the output pinion 30, and is connected to and rotatably supported on a side housing 36 by a plurality of conventional fasteners such as bolts 38. The side housing 36 has an outwardly extending tubular or hub portion 40 which is rotatably supported in the differential carrier 12 by a plurality of bearings 42. The housing 36 and ring gear 34 together define a hollow substantially disc-shaped internal chamber 44. Internally of the carrier 12, a differential case 46 is defined by a two-piece member having a first case portion 48 and a second case portion 50. A plurality of fasteners 66 disposed in a plurality of complementary bores 68 operate to secure the two halves 48 and 50 of the case 46 together. The first case portion 48 is provided with a radially extending flange portion 52 to which the ring gear 34 is attached by the fasteners 38.

A pair of differential side gears 54 and 56 are splined to differential output shafts 58 and 60, respectively. The side gears have a plurality of teeth in meshing engagement with opposed complementary teeth of at least one pinion gear 62, which is rotatably mounted on a differential pinion gear shaft 64. The shaft 64 is centrally positioned within the differential case 46 and structurally secured thereto for rotation.

A friction clutch assembly 70 defines a pack of interleaved friction discs positioned within the cavity 44. A selected number of friction discs 72 are provided with tabs (not shown) which provide a fixed relationship thereof with respect to the housing 36. The friction discs 72 are thereby maintained in position and drivingly rotated with the ring gear 34. An equal number of complementary friction discs 74 are splined to an intermediate clutch gear 88 and are inner digitated or interleaved with friction discs 72, as will be appreciated by those skilled in this art.

A manual clutch selector member 85 includes an annular clutch collar member 86 which interfaces with the differential case 46, the intermediate clutch gear 88, and the left side gear 54, either singly or in combinations to be described herein. A plurality of coiled springs 102 are interposed between the side housing member 36 and the friction clutch pack 70 to insure a suitable amount of torque between interleaved discs 72 and 74, as will be appreciated by those skilled in the art.

The foregoing description applies generally to all of the herein-described preferred embodiments of this invention. Now, however, the specific alternately preferred embodiments will be described in detail.

A first preferred embodiment is depicted above the centerline A—A of FIG. 1. As is true of all of the embodiments, the left-most position 1, as depicted in phantom, is a conventional differential position. The center position or position 2, is a constant bias position, while the right-most position 3 is a lock-up position, or a position in which the axles act as a solid or common axle. Thus, in the left-most position of the first preferred embodiment, it may be observed that the annular clutch collar member 86 is rotationally fixed only with the intermediate clutch gear 88. The intermediate clutch gear 88 includes internal teeth 90 which mate with corresponding external gear teeth 92 of clutch member 86. Thus, in the left-most position, the differential case 46 and the side gear 54 operate conventionally, and are both free to turn independently of the annular clutch collar member 86.

In the intermediate or second position shown in phantom, the clutch collar member 86 has been advanced one position to the right to engage external splines 114 of the left differential output shaft 58 by means of internal splines 116 of the clutch collar member 86. Thus, in this position, the clutch collar 86 is rotationally fixed with respect to both the intermediate clutch gear 88 and the side gear 54 through its associated output shaft 58. In this position it will be appreciated that the differential movement will involve the clutch pack 70, and thus a constant bias differentiation will be effected. In the third position shown, the clutch collar 86 is shifted one notch further rightwardly, and additionally engages the differential case 46 by means of internal gear teeth 112 thereof becoming interlocked with mating external gear teeth 110 of the clutch member 86. In this position, the clutch collar is rotationally fixed to the differential, as well as to the side gear output member 58, and, as such, the axle members 58 and 60 will operate as a solid axle.

A second preferred embodiment is shown below the centerline A—A in FIG. 1. Again, in the left most or the conventional differential position 1 as shown, the clutch collar member 86 engages only the intermediate clutch gear 88 which contains internal teeth 90. The teeth 90 as in the first preferred embodiment communicate with corresponding external gear teeth 92 of the clutch member 86. In the second position or constant bias position of the second preferred embodiment, the clutch collar has been moved rightwardly one position to engage the external gear teeth 118 of the hub 80 of the left side gear 54. In this embodiment, the clutch member 86 contains internal gear teeth 120 which mate with the latter external gear teeth 118. In the third position of the second preferred embodiment, the clutch collar 86 has been moved fully rightwardly to engage the differential case 46 by means of external gear teeth 110' of clutch member 86, which are mated with internal gear teeth 112' of differential case 46. Note that in this embodiment the latter associated teeth 110', 112' are internally of the clutch pack 70.

Referring now to FIG. 2, a third embodiment is shown wherein gear teeth 90 and 92 are engaged in the first or conventional differentiation position as in the first and second preferred embodiments. In the second position, however, the external gear teeth 124 of the clutch collar member 86 have meshed with internal gear teeth 122 on the left side gear 54. Finally, in the third position of the third preferred embodiment, the clutch collar 86 has been moved fully rightwardly to engage the differential case 46 via gear teeth 110", 112".

Referring now to FIG. 3, a fourth preferred embodiment is shown wherein mating annular face coupling teeth 126 and 128 are employed to couple the clutch member 86 with the left side gear 54, respectively, in a second position of the member 86. All other respective positions are similar to those described with respect to the third embodiment. Finally, as shown in FIG. 3, stacks of Belleville springs 130 are utilized in lieu of coiled springs 102 for urging the discs 72 and 74 of the friction pack 70 together.

The foregoing particularly described embodiments are but a few of the many variants envisioned within the scope of this invention.

What is claimed is:

1. In a limited slip axle differential including a differential case, pinion means for driving said case, first and second clutch means externally positioned of said case, and at least two output drive members driven by said case; said first clutch means comprising at least one input and at least one output friction member, said input friction member rotatably secured to said case, said output friction member secured to said second clutch means for rotation therewith, said first clutch means further comprising spring means for loading said input and output friction members into driving engagement with each other, said second clutch means comprising a clutch collar slidable over one of said output drive members, said collar selectively actuable between first and second positions, the first of said positions for operatively connecting said first clutch means to said output drive member, and the second for operatively disconnecting said first clutch means from said output drive member; an improvement comprising said collar being selectively movable to a third position, said third position for operatively connecting one of said output drive members directly to said differential case for fixed coupled rotation of said output drive member with said case, the positional movement of said collar effecting the driving of both said output drive members by said case.

2. The limited slip axle differential of claim 1 wherein said clutch collar is piloted within said output friction member, and splined thereto in each of said three positions.

3. The limited slip axle differential of claim 2 wherein one of said output drive members comprises external splines, and wherein said clutch collar comprises internal splines, matingly engageable with said external splines of said output drive member, whereby said first clutch means may be operatively connected to said one of said output drive members for direct rotation therewith.

4. The limited slip axle differential of claim 2 wherein one of said output drive members comprises internal splines and wherein said clutch collar comprises external splines matingly engageable with said internal splines of said output drive member, whereby said first clutch means may be operatively connected to said one of said output drive members for direct rotation therewith.

5. The limited slip axle differential of claims 3 or 4, wherein said differential case comprises internal splines, and said clutch collar further comprises external splines matingly engageable with said internal splines of said differential case, whereby said one of said output drive members may be operatively connected to said differential case for direct rotation therewith.

6. The limited slip axle differential of claim 5 wherein said spring means comprises a plurality of Belleville springs for loading said input and output friction members together.

7. The limited slip axle differential of claim 5 wherein said input and output friction members each comprise a plurality of discs, said discs of respective friction members being interleaved together, whereby said discs of said output friction member are frictionally driven by said discs of said input friction member.

8. The limited slip axle differential of claim 1 wherein said second clutch means further comprises a single clutch selector member for operatively moving said clutch collar between said first, second, and third selective positions.

* * * * *